United States Patent

Arnold et al.

[11] 4,051,368
[45] Sept. 27, 1977

[54] METHOD OF MEASURING HORIZONTAL FLOW SPEED OF FLUIDS IN EARTH FORMATIONS PENETRATED BY A WELLBOREHOLE

[75] Inventors: Dan M. Arnold; Hans J. Paap; Hubert D. Scott, all of Houston, Tex.

[73] Assignee: Texaco Inc., New York, N.Y.

[21] Appl. No.: 698,394

[22] Filed: June 21, 1976

[51] Int. Cl.² .............................................. G01V 5/00
[52] U.S. Cl. .................................................. 250/270
[58] Field of Search ............... 250/259, 264, 265, 266, 250/270

[56] References Cited

U.S. PATENT DOCUMENTS 3,304,424  2/1967  Mills, Jr. ............................. 250/270
3,603,795  9/1971  Allauo .................................. 250/264
3,851,171  11/1974 Saniford et al. ..................... 250/259

Primary Examiner—Davis L. Willis
Attorney, Agent, or Firm—Carl G. Ries; Thomas H. Whaley; William J. Beard

[57] ABSTRACT

The horizontal flow rate of fluid in permeable earth formations is measured by the in situ creation of a radioactive tracer isotope having a predetermined decay life time and decay mode. Measurements at different time intervals following the creation of the tracer isotope of the decay radiation may then be interpreted in terms of the horizontal movement of fluids past a well borehole. Tracer isotopes to be created are selectively provided for measuring both relatively fast and relatively slow expected values of horizontal flow speed.

10 Claims, 5 Drawing Figures

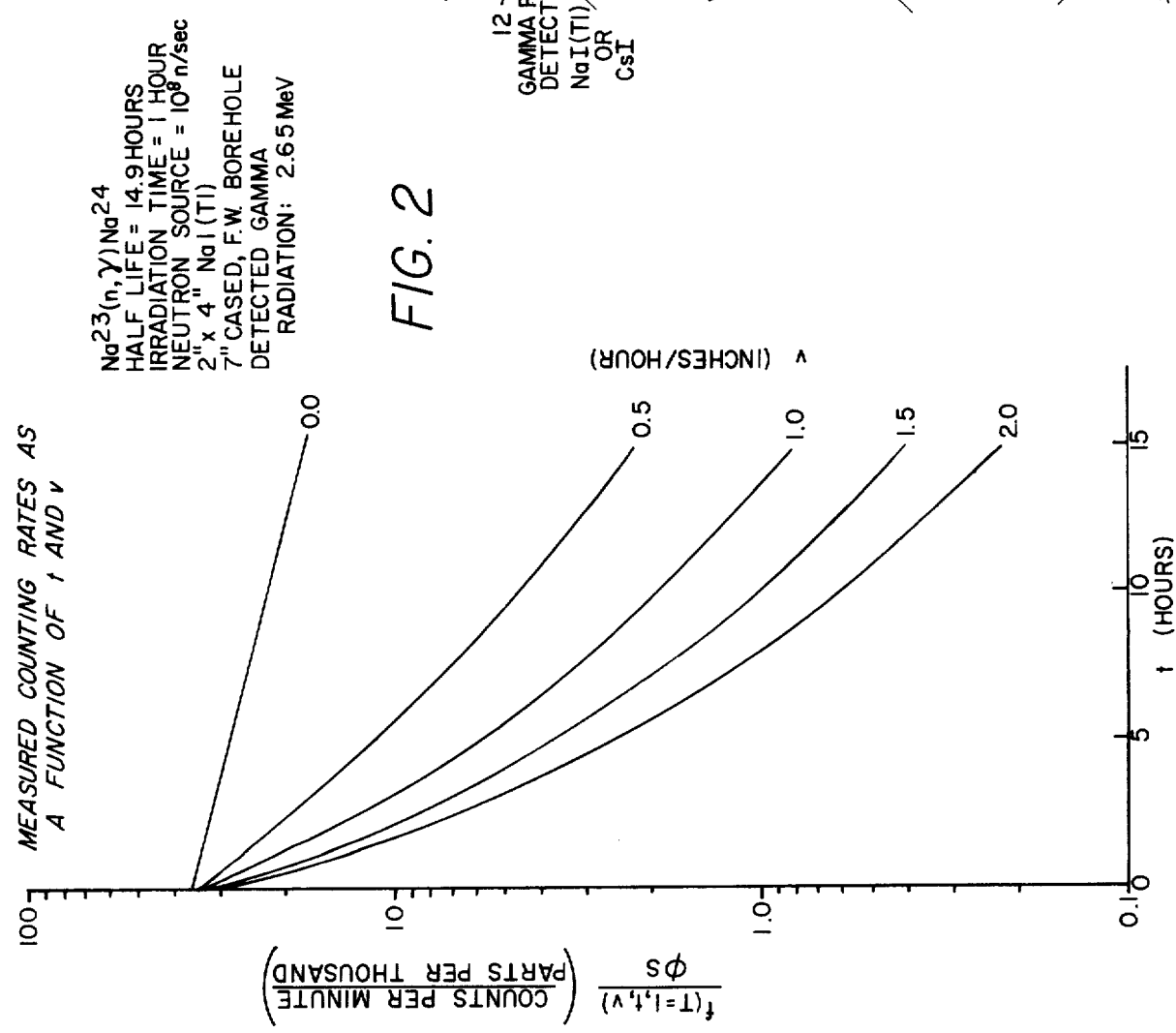

METHOD OF MEASURING HORIZONTAL FLOW SPEED OF FLUIDS IN EARTH FORMATIONS PENETRATED BY A WELLBOREHOLE

BACKGROUND OF THE INVENTION

This invention relates to radioactivity well logging techniques and more particularly to such techniques which are applicable for determining the lateral flow speed of fluid in earth formations in the vicinity of a well borehole by the employment of neutron activation and the analysis of resultant gamma radiation produced thereby.

In secondary and tertiary recovery for petroleum deposits many of the recovery techniques employ the injection of water or chemical solutions into the earth formations comprising the reservoir from injection wells. In planning the recovery operation, the injection of water or chemical has in the past been limited by certain assumptions and/or approximations concerning the mobility of fluids in the formation comprising the reservoir. A crucial factor in such fluid injection programs is the vertical conformity of producing formation as well as its horizontal permeability and uniformity. In some reservoirs, formation lensing or horizontal partitioning by permeability barriers such as faults can occur. In such instances, apparently correlevant intervals of permeability may be separated from one well to another in the field by such formation lensing or permeability barriers being interposed across the interval of formation between the wells.

It is therefore apparent that some knowledge of the existence of such lensing or permeability barriers could prevent the injection of large amounts of costly chemicals or water into a recovery pattern in which formation continuity between injection wells of a field is partially or totally absent. This could prevent the expenditure of large sums of money, time and effort in a fruitless project to recover secondary or tertiary problem deposits.

A second application of the detection of lateral waterflow measurement is the mapping of the total flow throughout a petroleum reservoir to help in the operational planning of injecting chemicals or water and to assist in determining optimum withdrawal rates. Moreover, a knowledge of the lateral water flow characteristics of a particular formation in a producing field can help greatly in general understanding of the reservoir dynamics of the particular reservoir being produced.

Also it is sometime desirable in a reservoir with multiple producing intervals for a reservoir engineer to be able to delineate those producing zones which provide the most water influx or water drive to the production of petroleum. The mapping of lateral water movement in all zones both above and below the expected water table in the producing formation should supply this information to the reservoir engineer.

In the past reservoir engineers have been provided with relatively few and often inaccurate well logging instrumentation in order to determine the vertical conformance characteristics of the earth formations comprising a reservoir. This has led to resultant confusion as to the properties of the earth formations making up the reservoir. Radioactive tracer studies of the movement of fluids in the vicinity of a well borehole can be misleading in this respect because of the lack of uniform absorption of the tracer element into the flowing stream of formation water. Also, it is difficult to provide tracer isotopes with sufficient half life to be injected at an injection well and observe their movement days or even weeks later at a monitoring or producing well, in order to obtain some idea of the lateral flow speed or velocity of fluids in the formation comprising the reservoir.

Accordingly, it is a principal object of the present invention to provide a relatively economical and accurate technique for observing the lateral movement and later flow speed of formation fluids in the vicinity of a well borehole.

According to the technique of the present invention the relatively slow lateral movement of fluids in the vicinity of well borehole may be accurately determined by the neutron activation of the element sodium comprising a portion of the fluids present in the formation in the vicinity of the well borehole. The observation of the counting rate of decay of the radioactive isotope of sodium produced by the neutron activation as a function of time may then, according to the techniques of the present invention, be interpreted in terms of the flow speed of the earth formation fluids in the vicinity of the borehole. Techniques are provided in making this measurement for eliminating or substantially reducing the effects of background radiation due to other elements which are activated in the neutron activation process. By use of the novel techniques of the invention more accurate results than obtainable from previous radioactive tracer injection techniques due to the nonuniform acceptance of tracer materials by the formation are eliminated by the in-situ creation of the radioactive tracer element.

Other objects, features and advantages of the present invention will become apparent to those skilled in the art when considering the following detailed description of the invention. The invention is best understood by reference to the following detailed description thereof when taken in conjunction with the accompanying drawings in which:

BRIEF DESCRIPTION OF THE DRAWINGS

FIG. 2 is a graphical representation illustrating the measured counting rates as a function of time and the speed of horizontal fluid movement of fluids in the vicinity of a well borehole.

FIG. 3 is an illustration showing schematically a well logging sonde for horizontal water flow detection in accordance with the principles of the present invention.

DESCRIPTION OF THE EMBODIMENT

The present invention is based on the in-situ creation of radioactive isotopes within the formation fluids in the vicinity of a well borehole. As an example of this the radiation of water in the vicinity of a well borehole with high energy neutron having an energy in excess of approximately 10 MEV can result in the creation of the radiation isotope nitrogen 16 by the nuclear reaction $O^{16}(n,p)N^{16}$. If the formation fluid is saline in nature the radioactive isotope sodium 24 can be produced by radiating the earth formations with neutrons which are slowed to thermal energy and captured by the more common isotope sodium 23 comprising NaCl in solution according to the nuclear reaction $Na^{23}(n,\gamma)Na^{24}$.

If a well logging sonde containing a neutron source is positioned within an earth formation containing water (which is saline in nature) a radioactive sodium isotope is produced in the water which decays by the emission of gamma radiation. If the neutron source is then replaced by gamma ray detector a decrease of the gamma radiation in intensity as a function of time can be observed. If the formation fluid is not moving, the observed decrease in activity with time $t$, will follow the exponential decay $e^{-\lambda t}$ wherein $\lambda$ is the decay constant of the induced radioactivity. If, however, the fluid is moving in a horizontal direction with respect to the gamma ray detector the observed decrease in activity will be due to the exponential decay characteristic plus an additional decrease caused by the induced radioactivity in the fluid being swept away from the vicinity of the detector by the moving fluid. The observed decrease in the induced activity above the expected exponential decay characteristic can then be used to determine the horizontal linear speed of the moving fluid.

Figure 1:
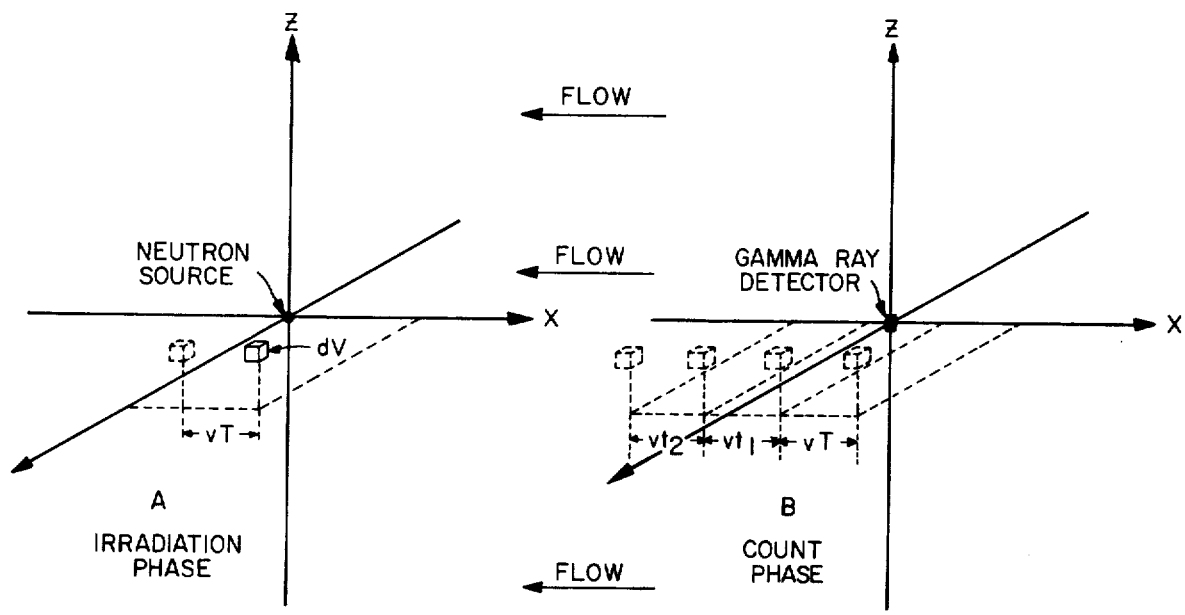
FIG. 1 is a schematic drawing illustrating the geometry of the neutron activation and radioactive decay of a small volume element of formation fluid.

Referring now to FIG. 1 and considering a point neutron source positioned at the origin $x=y=z=0$ of the coordinate axes of the figure within a flowing fluid having a linear velocity $v$ in the minus $x$ direction of the coordinate system, then if this fluid is irradiated with neutrons for a radiation interval the gamma ray activity induced within a small volume element $dV$ whose position is $(x, y, z)$ at the beginning of the neutron radiation is given by the expression of Equation 1

$$dA(T,v,x,y,z) = \frac{A_o \Sigma dV}{4\pi} \lambda e^{-\lambda T} \int_o^T \psi(t) e^{\lambda t} dt \tag{1}$$

where $A_o$ = neutron source strength in neutrons/sec
$\lambda$ = decay constant of the radioactive isotope of interest
$\Sigma = N_o \rho \sigma P_i / 100 M_i$
where
$N_o$ = Avogadro's number
$\rho$ = the density of the liquid
$\sigma_i$ = the cross-section for the reaction producing the radioactive isotope of interest
$P_i$ = the percentage abundance of the target isotope within the liquid
$M_i$ = the atomic weight of the target isotope In Equation 2 the term $\psi$ represents the thermal neutron flux distribution for a two neutron group diffusion model and is given by the expression of Equation 2 as follows:

$$\psi = \frac{((x-vt)^2 + y^2 + z^2)^{-\frac{1}{2}}}{S_2(L_1^2 - L_2^2)} \cdot \{e^{-((x-vt)^2+y^2+z^2)^{\frac{1}{2}}/L_1} - e^{-((x-vt)^2+y^2+z^2)^{\frac{1}{2}}/L_2}\} \tag{2}$$

where
$S_2$ = the slowing down power
$L_1$ = the diffusion length for the first neutron group (fast neutrons)
$L_2$ = the diffusion length for the second group (thermal neutrons)

If the neutron source is then removed and a gamma ray detector is positioned at $x=y=z=0$ of the coordinate axes as is illustrated in FIG. 1, the induced radioactivity from the volume element $dV$ registered within the detector at some time $t$ measured from the end of the radiation interval is given by the expression of Equation 3:

$$df(T,t,v,x,y,z) = E_\gamma \frac{dA(T,v,x,y,z) e^{-\lambda t}}{4\pi} \cdot \frac{e^{-\mu((x-v(t+T))^2+y^2+z^2)^{\frac{1}{2}}}}{(x-v(t+T))^2+y^2+z^2} \tag{3}$$

where
$E_\lambda$ = the efficiency of the detector for the gamma radiation of interest
$M$ = the linear attenuation coefficient for the gamma radiation of interest.

Now substituting Equation 1 into the Equation 3 and integrating over all volume elements $dV$ the total radioactivity registered by a detector at time $t$ is given by the expression of Equation 4 as follows:

$$f(T,t,v) = \frac{\lambda A_o E_\gamma \Sigma e^{-\lambda(t+T)}}{(4\pi)^2} \int_x \int_y \int_z [\int_o^T e^{+\lambda t}\psi dt] \cdot \frac{e^{-\mu((x-v(t+T))^2+y^2+z^2)^{\frac{1}{2}}}}{(x-v(T+t))^2+y^2+z^2} dx dy dz \tag{4}$$

Equation 4 can be integrated numerically in order to evaluate the integral term thereof.

If it is now assumed that (1) the fluid is contained in a permeable formation of porosity $\phi$, (2) that the reaction of interest is only the $Na^{23}(n,\gamma)Na^{24}$ reaction having a half life of approximately 14.9 hours, and (3) that all of the sodium contained in the formation is contained in the formation fluid in the form of sodium chloride, then the term $\Sigma$ of equation 4 can be expressed in terms of $\phi$, the porosity and $S$, the salinity of the formation fluid. FIG. 2 shows the general form of the function $f(T,t,v)/\phi S$ as a function of time $t$ for the 2.75 MEV gamma radiation from the reaction $Na^{23}(n,\gamma)Na^{24}$. In FIG. 2 the constants of Equation 4 are taken to be as follows:

$\lambda$ = 0.0465 hours $^{-1}$
$T$ = 1.0 hours
$A_o$ = $10^8$ neutrons/second
$S$ = is the salinity of the formation fluid in parts per thousand (ppt) sodium chloride
$\phi$ = the formation porosity (fractional)

The remaining constants in Equation 4 for the function $f(T,t,v)$ are obtained from the normalization of data taken in controlled test formations with known borehole conditions. Data taken in a cased fresh water filled 7 inch borehole and using a 2 inch by 4 inch thallium activated sodium iodide scintillation counter crystal was used in obtaining the curves of FIG. 2.

In FIG. 2 it can be observed that the decay rate at zero velocity is approximately a straight line on the logarithmic scale of the presentation of the figure. The family of curves below the zero velocity curve shows the affect of the linear velocity of the flowing fluid on the decrease in counting rate as a function of time for the values of the constants chosen in this representation.

It will be shown subsequently that a knowledge of S and $\phi$ is not required in order to obtain $v$ the linear flow speed in the horizontal direction. These quantities do, however, affect the recorded counting rates which in turn affect the statistical accuracy of the computed quantity $v$, the linear flow speed in the horizontal direction. It will be appreciated by those skilled in the art that the graphical illustration of FIG. 2 represents one configuration of assumptions pertaining to the formation porosity and salinity of the formation fluids, but that other similar relationships may be obtained for different values of water salinity, porosity and detector efficiencies and neutron source strength by the same process of the evaluation according to equation 4 of these different parameters.

By using FIG. 2, estimates of the counting rate of gamma rays from the decay of the radioactive sodium 24 under field conditions may be obtained. For example, in a formation having a porosity of 30% which is saturated with 100 parts per thousand sodium chloride water which is moving horizontally at a linear velocity of $\frac{1}{2}$ inch per hour, a counting rate recorded at a $t = 2$ hours after the termination of a $T = 1$ hour irradiating period can be shown to be approximately 645 counts per minute. This counting rate would be adequate to provide accurate measurement of the linear flow of velocity in a horizontal direction with sufficient statistical accuracy to insure usefulness of the measurement.

Referring now to FIG. 3 a horizontal water flow measuring system in accordance with the concepts of the present invention is shown schematically. A downhole sonde 10 is shown suspended by a well logging cable 13 in a well borehole 17 which is filled with borehole fluid 16 and surrounded by earth formations 18. The well logging cable 13 passes over a sheave wheel 19 which is mechanically or electrically coupled, as indicated by the dotted line 20, to a recorder 14 so that measurements from the downhole sonde 10 may be recorded as a function of depths in a well borehole 17. Housed in the downhole sonde 10 is, at its lower end, a neutron source 11 which may be a continuous chemical neutron source such as Actinium Berylium source, an Americium Beryllium source or a Californium 252 source as may be desired. For best results the neutron source should have an intensity of at least $10^8$ neutrons per second.

Spaced about 5 feet from the neutron source is a single gamma ray scintillation detector 12. The detector 12 comprises a sodium iodide thalium activated crystal or a cesium iodide thallium activated crystal approximately 2 inches by 4 inches in the extent and cylindrical in shape. The scintillation crystal of detector 12 is optically coupled through a photomultiplier tube (not shown) which functions to count scintillation or light flashes, occuring in the crystal from impingement thereon by high energy gamma rays from radioactive materials in the vicinity.

As is well known in the art, the pulse height of voltage pulses produced by the photomultiplier of detector 12 are proportional to the intensity of the gamma rays impinging upon the detector 12 crystal. The intensity of these light flashes is in turn functionally related to the energy of the gamma rays impinging upon the crystal. Thus a succession of pulses from the detector whose pulse height is proportional to the energy of the impinging gamma rays is produced and is coupled to a surface pulse height analyzer 14 via a conductor of the well logging cable 13 in a manner well known in the art. It will be appreciated by those skilled in the art that appropriate power sources (not shown) may be supplied at the surface and connected to the downhole electronic equipment via conductors of cable 13 in order to supply operational power for the downhole detector 12. The details of such power supplies and couplings are not illustrated in FIG. 3 as these are conventional in the art.

The space between the neutron sourc 11 and the detector 12 in the downhole sonde 10 is shielded by a shielding material 15 of suitable type to prevent direct irradiation of the detector crystal with high energy neutrons from the neutron source 11. Shielding materials with high hydrogen content such as paraffin or other poly-molecular hydrocarbon structure may be utilized for this purpose. The high hydrogen content serves to slow down or rapidly attenuate the neutron population from the neutron source and prevent this thermalized neutron population from reaching the vicinity of the detector crystal. To this end, strong thermal neutron absorbers such as cadmium may be interposed in layers with the hydrogenate shielding material in order to make up the shield portion 15.

Signals from the downhole detector 12 are transmitted to the surface via the logging cable 13 and are provided as input to the pulse height analyzer/recorder 14. A lower energy window threshold which is set at approximately 2.65 MEV is utilized in the pulse height analyzer/recorder 14. All other significant quantities of naturally occuring gamma rays of radio isotopes and isotopes which can be produced in the earth formations using the chemical type neutron source 11 have characteristic gamma rays of emission below the 2.65 MEV threshold. However, sodium 24 which is produced in the formation fluids by the irradation with the neutron source 11 decays principally by the emission of a 2.75 MEV gamma rays. Thus by the use of the 2.65 MEV threshold the radiation which is observed by the downhole detector 12 may be limited, for practical purposes, to that caused by the decay of the unstable radioactive isotope sodium 24.

Consider two hypothetical earth formation layers labeled A and B in FIG. 3 and which are penetrated by the cased well borehole 17 of that figure. It may be of interest to determine if water is moving horizontally in either of these two zones of interest. A logging operation according to the principles of the present invention may be initiated by first positioning the neutron source 11 within zone A and irradiating this zone for approximately 1 hour with high energy neutrons. It should be noted here that the irradiation time interval may be varied and can generally be less than 1 hour if the salinity of the formation water or the strength of the neutron source is adequate. However, for purposes of this illustrative example a radiation interval of 1 hour is chosen. Once zone A has been irradiated for the desired time interval, the well logging sonde is raised as fast as possible until the neutron source 11 is positioned adjacent zone B. At this point in time zone B is then also irradiated for a 1 hour interval with high energy neutrons.

Following the irradiation of zone B the well logging sonde 10 is lowered below zone A as quickly as possible and a continuous logging operation is initiated in which the sonde is slowly raised through zone A. The curves by the logging operation presently being described are illustrated schematically in FIG. 4 of the drawings. It will be observed that a sharp increase in the count rate is recorded as the detector 12 moves past the activated spot in zone A. The time $t_1A$ at which the detector passe zone A measured from the end of the irradiation of zone A is recorded. The upward movement of the sonde is continued until a sharp increase in counting rate denotes that the detector has passed the activated region of zone B. The time $t_1B$ at which the detector passes the activated region of zone B is measured from the end of the irradiation of zone B and is recorded also.

The sonde is then moved rapidly downward past zone A and a second upwardward logging pass is initiated. The time $t_2^A$ and $t_2^B$ are again recorded (where here the subscript 2 denotes the second logging pass).

During the neutron activation phase sodium 24 will also be produced within the borehole fluid if the fluid is saline. However, during the subsequent movement of the sonde this activated borehole fluid will be effectively disbursed up and down the borehole by the movement of the well logging sonde. It has been found in usage that this dispersal of the borehole fluid is adequate to insure a reduction of the background due to sodium 24 produced in the borehole below a harmful level.

Figure 4:
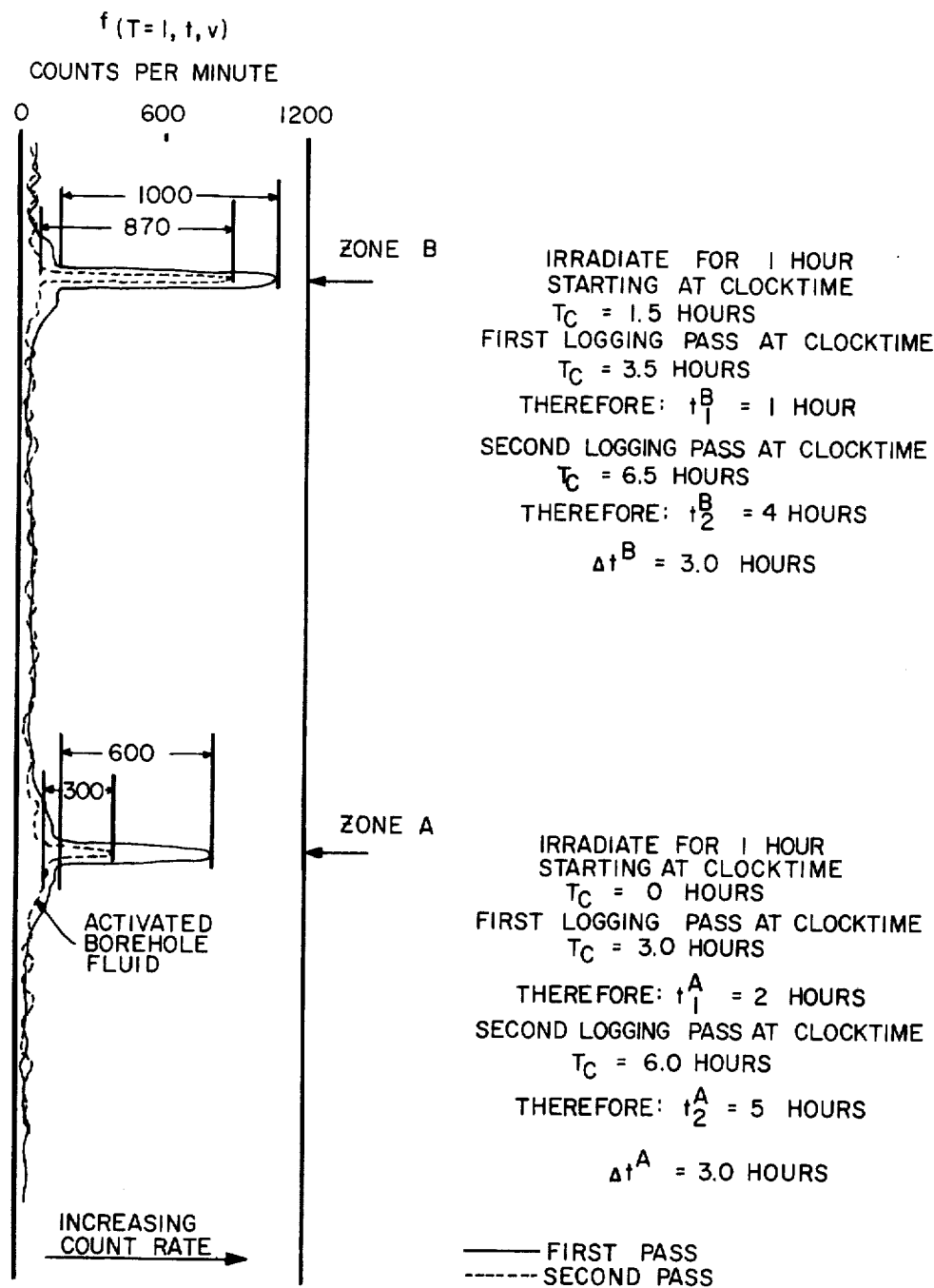
FIG. 4 is a graphical schematic illustration showing a well log according to the principles of the present invention.

The background count level shown in FIG. 4 is representative of this background sodium 24 produced in the activated borehole fluid. As may be seen in the drawing of FIG. 4 such background radiation is not sufficient to cause confusion between the sharp peaks occuring at the irradiated points of zones A and B.

In order to detect the horizontal flow rates it is only necessary to observe the relatively sharp spikes in the depth logs of FIG. 4 and to relate these to the nomogram of FIG. 5 as will be described subsequently. From the example log shown in FIG. 4 it can be seen for zone A the irradiation peak on the first logging run is approximately 600 counts per minute while the irradiation peak on the second logging run is approximately 300 counts per minute. For zone A also, $t_1^A = 2$ hours and $\Delta t_A$ is the elapsed time between the second logging run and first logging run past zone A which is 3 hours. Thus the ratio of counting rates in zone A, $R_A = 2.0$ for this example.

For zone B, the counting rate on the first logging pass is approximately 1,000 counts per minute while the counting rate on the second logging pass is approximately 870 counts per minute. For these two logging passes $t_1^B = 1$ hour and the elapsed time $\Delta t_B$ between logging passes equal 3 hours. Thus the ratio of the count rate on the two logging passes over zone $R_B = 1.15$.

Figure 5:
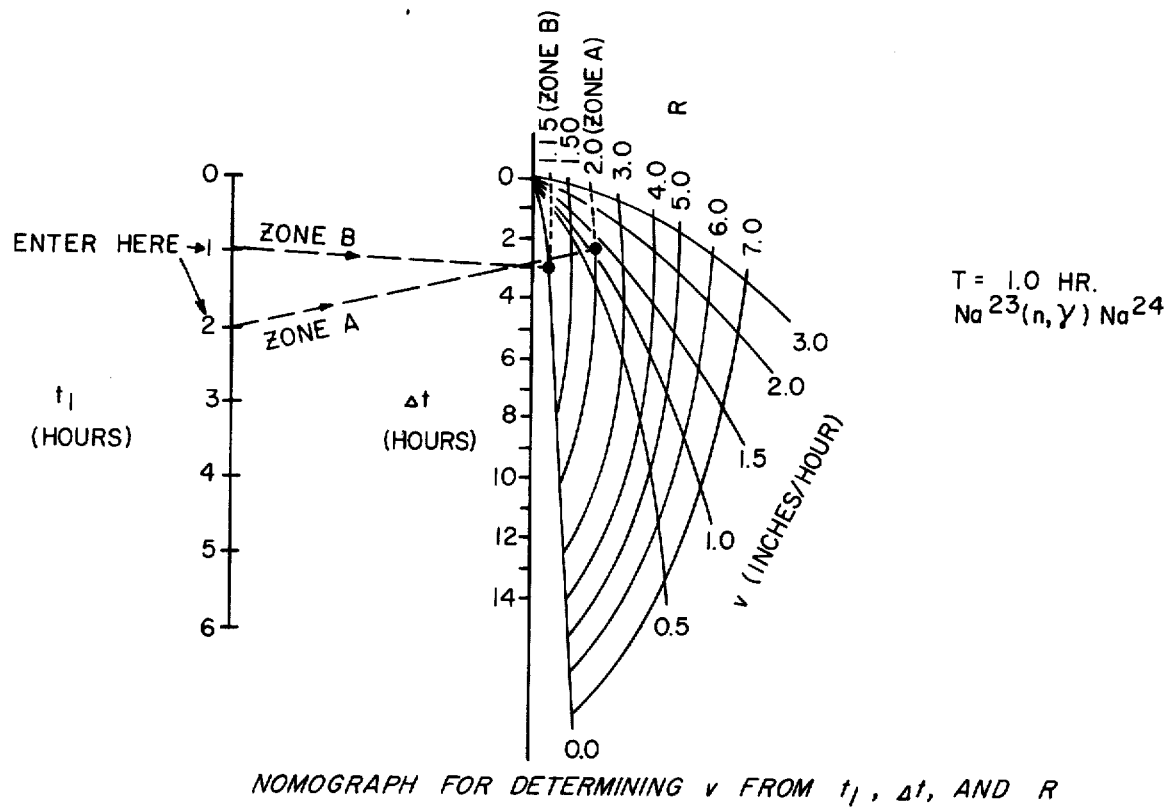
FIG. 5 is a nomograph for interpreting the radiation measurements of neutron activated elemental sodium according to the concepts of the invention. de

Referring now to FIG. 5, a nomograph constructed from the data plotted in FIG. 3 is illustrated in which it is possible to calculate the linear flow rate in the horizontal direction pass the irradiated zones. Entering the left-hand column of the nomograph a point is obtained on the first line to the left which corresponds to $t_1^A = 2$ hours. A second point on the second vertial axis to the right is obtained by the value of $\Delta t_A$ which, in this case, equals 3 hours. Drawing a line through these two points the intersection of this line with the curve drawn to the right corresponding to the value of the ratio of counts for the particular measurement (in this case $R_A = 2.0$) indicates that the velocity of horizontal flow which would produce this ratio corresponding to the measurement time intervals is approximately 1.0 inches per hour of horizontal flow. Following the same procedure and entering the values of $t_1^B = 1$ hour and $\Delta t_B = 3$ hours for zone B, it is seen that a ratio of 1.15 is indicative of zero horizontal flow through zone B during the time following the radiation intervals.

The nomograph described with respect to FIG. 5 represents one method of interpretating the measurements performed with the well logging system of FIG. 3. It will be appreciated by those skilled in the art however that this nomograph or other techniques which are analogous to the solution of the equations involved may be programmed for use on a general purpose digital computer rather than interpreted by the hand calculation technique according to the nomograph of FIG. 5. For example, the nomograph of FIG. 5 could be entered in tabular form in the memory of a general purpose digital computer. Appropriate interpolation and extrapolation techniques may be used to obtain the solutions corresponding to the measurement quantity. This type of solution would be apparent to those skilled in the art when presented with the nomograph of FIG. 5 or a corresponding nomograph corresponding to the calibration characteristics of a particular sonde.

The sodium 24 tracer which is produced in situ by the neutron irradiation according to the technique of the present invention is an ideal tracer isotope for relatively slow horizontal flow rates because of its long half life of about 14.9 hours and the relatively high energy gamma radiation which it emits upon its decay. If it is desired however to measure water flow rates which are relatively fast (on the order of feet per minute) it could be necessary to use a shorter lived tracer such as nitrogen 16 which has a half life of approximately 7.2 seconds. In such an instance it would be necessary to utilize a deuterium-tritium accelerator type neutron source rather than a chemical neutron due to the fact that the $O^{16}(n,p)N^{16}$ reaction has a MEV threshold energy. In this instance, however, the same theory and logging techniques which have been previously discussed with respect to the use of sodium 24 tracer could also be applied using the nitrogen 16 tracer.

The foregoing descriptions may make other alternative techniques apparent to those skilled in the art. It is therefore the aim in the appended claims to cover all such changes and modifications as fall within the true spirit and scope of the invention.

We claim:

1. A method for determing the location and flow rate of earth formation fluids moving in a horizontal direction past a well borehole, comprising the steps of:
    irradiating the earth formations in the vicinity of a well borehole with fast neutrons for a predetermined length of time to neutron activate at least one selected tracer element having a known radioactive half life and comprising a portion of the earth formation fluid moving past a well borehole;
    moving a gamma ray detector past the earth formation which has been irradiated and detecting a first count rate signal representative of gamma radiation caused by the radioactive decay of said selected tracer element;
    waiting a predetermined selected length of time and then again moving said gamma ray detector past the earth formation which has been irradiated and detecting a second count rate signal representative of gamma radiation caused by the radioactive decay of said selected tracer element; and
    combining said first and second count rate signals according to a predetermined relationship to derive an indication of the horizontal flow rate of earth formation fluid past the well borehole.

2. The method of claim 1 wherein said combining step includes compensating any difference in said first and second count rate signals for the difference therein due to the natural half life of said selected tracer element.

3. The method of claim 2 wherein the waiting time is selected to be at least one twentieth of the natural radioactive half life of the selected tracer element.

4. The method of claim 1 and further including the step of, prior to making said gamma ray detector counts, disbursing the borehole fluid in the vicinity of the irradiated earth formations by movement thereof, thereby lowering any background gamma radiation due to the presence of any neutron activated selected tracer element being present in the borehole itself.

5. The method of claim 1 wherein the steps of detecting said gamma radiation caused by the radioactive decay of said selected tracer element is performed by detecting said gamma radiation only in a selected energy range corresponding to the characteristic decay mode of said selected tracer element.

6. The method of claim 1 wherein said selected tracer element is chosen to be sodium isotope 24.

7. The method of claim 6 wherein the detecting steps are performed by detecting gamma radiation only in an energy range above 2.65 MEV.

8. The method of claim 1 wherein said selected tracer element is chosen to be nitrogen isotope 16.

9. The method of claim 8 wherein said irradiation step is performed by the use of a deuterium-tritium accelerator type neutron source.

10. The method of claim 1 wherein said irradiation step is performed by the use of a deuterium-tritium accelerator type neutron source.

* * * * *